United States Patent
Cantrell et al.

(10) Patent No.: US 10,573,116 B2
(45) Date of Patent: Feb. 25, 2020

(54) SYSTEM AND METHOD FOR MANAGING PACKAGES IN A KIOSK

(71) Applicant: Walmart Apollo, LLC, Bentonville, AR (US)

(72) Inventors: Robert Cantrell, Herndon, VA (US); Donald R. High, Noel, MO (US); Brian McHale, Oldham (GB)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/226,111

(22) Filed: Dec. 19, 2018

(65) Prior Publication Data
US 2019/0206176 A1  Jul. 4, 2019

Related U.S. Application Data

(60) Provisional application No. 62/611,775, filed on Dec. 29, 2017.

(51) Int. Cl.
*G06F 7/00* (2006.01)
*G07F 11/62* (2006.01)
(Continued)

(52) U.S. Cl.
CPC .............. *G07F 11/62* (2013.01); *B65C 1/02* (2013.01); *B65G 1/06* (2013.01); *G05B 19/4155* (2013.01);
(Continued)

(58) Field of Classification Search
None
See application file for complete search history.

(56) References Cited

U.S. PATENT DOCUMENTS 2,934,221 A   4/1960 Tonna
3,917,082 A   11/1975 Howard et al.
(Continued)

FOREIGN PATENT DOCUMENTS

WO   02072457 A1   9/2002

OTHER PUBLICATIONS

International Search Report and Written Opinion dated Mar. 15, 2019, issued in corresponding PCT Application No. PCT/US2018/066563.
(Continued)

*Primary Examiner* — Yolanda R Cumbess
(74) *Attorney, Agent, or Firm* — Venable LLP; Jeffri A. Kaminski

(57) ABSTRACT

A package storage system for a kiosk includes a shelf on which packages are stacked. The shelf is configured to be adjustable in a vertical height. The system also includes a sliding guide configured to be movable with respect to the shelf, and a clamp device having two adjustable side arms and slidably attached to the sliding guide. The clamp device is also configured to grip one of the packages by the two adjustable side arms. The system further includes a blade slidably attached to the sliding guide and configured to pull out a package that is stacked immediately beneath the one package griped by the clamp device. The system also includes a labelling device configured to label the packages inside the kiosk, and a receiving tray configured to receive the packages that are delivered to the kiosk. The system further includes a controller to control movement of the clamp device. The controller is further programmed to move the packages based on specified rules.

20 Claims, 4 Drawing Sheets

(51) Int. Cl.
    *G05B 19/4155* (2006.01)
    *B65C 1/02* (2006.01)
    *B65G 1/06* (2006.01)
    *G06Q 20/18* (2012.01)
    *G07B 17/00* (2006.01)
    *G07F 17/26* (2006.01)
    *G07F 17/42* (2006.01)

(52) U.S. Cl.
    CPC .............. *G06Q 20/18* (2013.01); *G07B 17/00* (2013.01); *G07F 17/26* (2013.01); *G07F 17/42* (2013.01); *G05B 2219/40154* (2013.01)

(56) References Cited

U.S. PATENT DOCUMENTS

| | | | |
|---|---|---|---|
| 4,692,876 A | 9/1987 | Tenma et al. | |
| 5,226,782 A * | 7/1993 | Rigling | B65G 1/0407 |
| | | | 198/347.3 |
| 6,139,254 A | 10/2000 | Ouellette | |
| 7,210,894 B2 | 5/2007 | Huang et al. | |
| 8,972,041 B2 | 3/2015 | Hancock et al. | |
| 9,573,684 B2 | 2/2017 | Kimchi et al. | |
| 9,758,301 B2 | 9/2017 | Porat | |
| 2015/0332206 A1 | 11/2015 | Trew et al. | |
| 2017/0158430 A1 | 6/2017 | Raizer | |
| 2017/0255896 A1 | 9/2017 | Van Dyke | |

OTHER PUBLICATIONS

Cleveron PackRobot, "PackRobot parcel terminal—the most efficient and modern parcel delivery terminal in the world", 2017, pp. 1-9.

"Safe Drone Delivery by Cleveron", https://youtube/kC5kzNj9kZI, pp. 1.

* cited by examiner

SYSTEM AND METHOD FOR MANAGING PACKAGES IN A KIOSK

CROSS REFERENCE TO RELATED APPLICATION

This patent application claims the benefit of U.S. Provisional Application 62/611,775 filed Dec. 29, 2017, the content of which is incorporated by reference herein.

BACKGROUND

1. Technical Field

The present disclosure relates to a package storage system. More specifically, the present disclosure relates to systems and methods for storing and retrieving packages in a kiosk.

2. Introduction

Storage facilities, for example kiosks, typically house more than one shelf having compartments for holding different packages. Some of those compartments may be dynamic, so that they can be resized to fit packages of different dimensions. But such kiosks have shelves that take up more space than needed. Further, one compartment only houses one package in such kiosks. In addition, the shelves inside the kiosks may need to be re-configured to accommodate new packages received after stored packages are retrieved from the shelves. Considering the limited space of the kiosks, such package storing systems are unable to provide an efficient and effective usage of the space inside the kiosks, and may also result in dissatisfied customers.

What is needed are systems and methods for storing packages in a kiosk to efficiently facilitate stocking and retrieval of packages, reduce shelf usage, and stack the packages automatically and intelligently.

SUMMARY

Disclosed herein are systems and methods, which overcome at least some drawbacks known in the art. An example package storage system for a kiosk can includes a shelf on which the packages are stacked. The shelf is configured to be adjustable in a vertical height. The system also includes a sliding guide configured to be movable with respect to the shelf, and a clamp device having two adjustable side arms and slidably attached to the sliding guide and configured to grip one of the packages by the two adjustable side arms. The system also includes a blade slidably attached to the sliding guide and configured to pull out a package that is stacked immediately beneath the one package griped by the clamp device; and a labeling device configured to label the packages inside the kiosk. The system further includes a receiving tray configured to receive the packages that are delivered to the kiosk. The system may also include a controller configured to control movement of the clamp device. The controller may further be programmed to move the packages based on specified rules and specified priorities.

An exemplary method for managing packages in a kiosk is also disclosed herein. The method can include receiving a package by the kiosk. The kiosk includes a receiving tray for receiving the packages. The method can further include determining a lowest available level of space of a shelf inside the kiosk with a fullness of less than a first specified fullness for storing the package; placing the package in an empty slot of the lowest available level of space of the shelf when the lowest available level of space of the shelf is determined to be less than the first specified fullness; determining a weight of the package when the lowest available level of space of the shelf is determined to be greater than the first specified fullness; determining a level of the shelf with a highest stack of packages with a fullness less than a second specified fullness, when the weight of the package is determined to be greater than a predetermined weight, wherein all levels of space of the shelf below the level with the highest stack of package are full; and placing the package in an empty slot of the level of the shelf with the highest stack of packages when the level of the shelf with the highest stack of packages is determined to be less than the second specified fullness.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Figure 1:
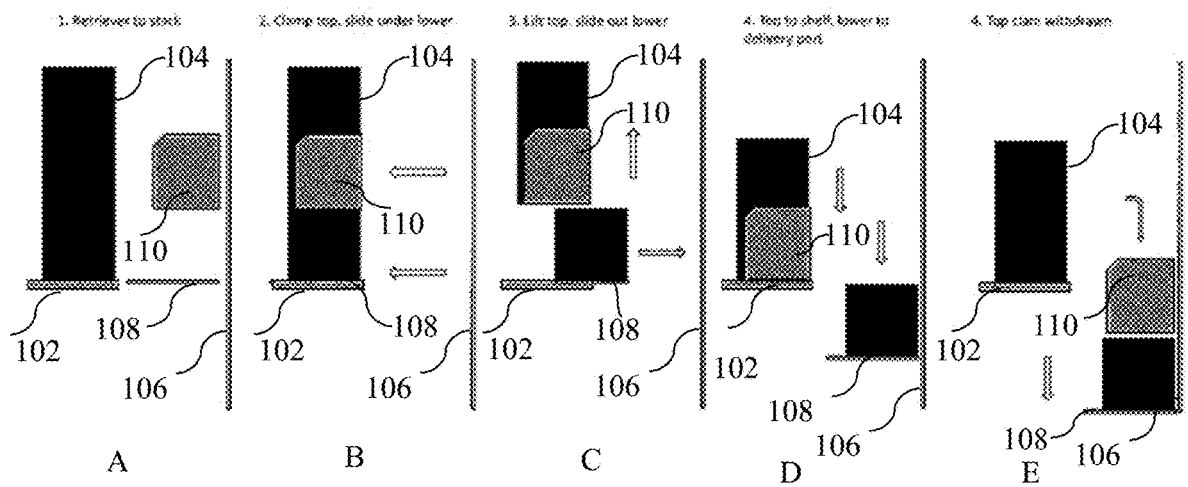
FIG. 1 illustrates an example system of managing packages in a kiosk according to one example embodiment.

Various configurations and embodiments of the disclosure are described in detail below. While specific implementations are described, it should be understood that this is done for illustration purposes only. Other components and configurations may be used without parting from the spirit and scope of the disclosure.

The concepts and embodiments described herein are for storing and retrieving packages in a kiosk. As disclosed, the kiosk may embody a package dispensing tower for automatically receiving packages delivered, for example by drones, storing the packages, and dispensing packages to customers. The kiosk can allow multiple packages to occupy one shelf, which allows denser packing of the packages within the tower and therefor allows for a smaller tower size. Additionally, shelf spacing inside the tower may be adjusted to allow a greater vertical distance between shelves. Further, the tower may use a printer to add a machine-readable code to a package.

In addition, a package retrieval system may be provided within the kiosk. Adjustable side clamps may be used to lift the packages stacked on top of a desired package, while a pusher can slide the desired package onto a conveyor for pickup by a customer. The disclosed system may use knowledge of a customer's planned arrival time to sort and store the packages on the shelves. The disclosed systems may allow for exemptions such as heavy packages or very small packages or oversize packages. The disclosed system may also screen the packages and may not accept packages beyond capability of the tower.

In some embodiments, the disclosed systems include a kiosk for receiving packages from unmanned aerial vehicles (UAVs) where a single shelf may hold stacked packages, allowing more packages to be stored than if each package rests on a shelf. The shelves themselves disclosed herein may be adjustable in size. Packages are stacked on top of each other to selected heights. This may be the most efficient way to utilize space of the shelves in the time between receipt of packages to the time for distribution and retrieval by customers. The packages may be retrieved from the stack of packages within the kiosk and distributed to customers for pick-up via a delivery window of the kiosk.

The disclosed system herein may be characterized by a kiosk for receiving delivery of packages, for example via a UAV. The packages are stored on one or more shelves within the kiosk for later pick-up by customers. Multiple packages are stacked on top of each other on a shelf. The shelves may move vertically to accommodate different heights of packages. A retriever unit moves packages. The retriever unit may include side clamps to grip opposite sides of a package, or a stack of packages, and lift them. An arm may be arranged between the clamps to slide under a package to assist with the lift. A controller may determine where and how to stack the packages on top of each other based on pick-up time, weight, size, etc. of the packages. Logic may be employed to raise the probability that packages are retrieved from top of a stack of package, which may be based on patterns of package retrieval uncovered in the data of given customers. For example, a customer may tend to stop by a kiosk after work and come home on a 5:39 PM train. The packages are arranged such that this customer's package may be quickly retrieved at the expected pick-up time.

A printer prints a machine readable label that identifies a package and is attached to the package such that the label is in a proper orientation to be read once the package is stacked.

In some embodiments, the systems disclosed herein may offer the following advantages.

The disclosed systems may allow unnecessary parts to be removed. A receiving tower or kiosk may not use shelves for each package. Rather, the packages can be stacked on top of each other on a shelf. The retriever unit sandwiches a package that may be between other packages to raise packages on top of the package, allowing the package to be retrieved and withdrawn. The whole package unit may begin to descend until the top packages are put back down. Then that arm of the retriever withdraws and the stacked package can be brought to the delivery window for pick up by a customer. Stacks may not be big—maybe a shelf space goes three packages up, for example, increasing the shelf space in principle. The process of stacking and retrieving the packages can be fully automated while waiting to deliver them to live customers or customer mail boxes.

The disclosed systems may allow different alternatives. For example, a bottom package may be grabbed horizontally by adjustable side clamps after top packages are lifted up. Alternatively, top packages are grabbed by adjustable side clamps so a bottom package can be removed.

The disclosed systems may allow packages to be separate. For example, packages that do not stack well may be given a separate shelf.

The disclosed systems may allow uniformity to be achieved. For example, customers may receive a discount—as per USPS Priority Mail Boxes—if they use a package specifically made for an UAV delivery tower, hence optimized to be stacked with like packages.

FIG. 1 illustrates a side view of an example system 100 of managing packages in a kiosk according to one example embodiment. As shown in FIG. 1A, the system 100 may comprise a shelf 102 on which one or more packages 104 can be stacked on top of each other. The packages 104 may be stacked on top of each other, either in height or stacked depth-wise as well. Unlike existing kiosks, the system 100 can save a lot of space because several packages can be stacked up and then each of those packages does not itself rest on a shelf (referred to as shelf-less), except for the package on the very bottom, which rests on any given shelf. Thus the kiosk can be designed to maximize the amount of storage in a limited space so that the kiosk can be as small as possible or no larger than necessary.

The system 100 may also comprise a maneuvering mechanism (also referred as a retriever) that may include a vertical sliding guide 106, a blade 108, and a clamp device 110. The vertical sliding guide 106 can be movable left to right and back and forth horizontally to automatically adjust a distance between itself and the package stack 104. The vertical sliding guide 106 may be configured to have a sliding groove along a vertical direction of the sliding guide 106. The sliding groove can provide a guide for both the clamp device 110 and the blade 108 to slide along in the groove vertically, such that the clamp device 110 and the blade 108 can travel vertically in a coordinated manner. The blade 108 can be a simple plate with various shapes having a uniform thickness for sliding into underneath a package. For example, the various shapes may be a square shape, a triangle shape, a round shape, or an oval shape. The blade 108 may be configured to extend and retract horizontally toward the package stack 104 and can slide vertically along the sliding guide 106. The clamp device 110 may be configured to have two or more adjustable side arms for holding and grabbing one or more packages from sides of the packages. The clamp device 110 may be configured to extend and retract horizontally toward the package stack 104 and can slide vertically along the sliding guide 106.

As shown in FIG. 1B, when a package at a lower portion of the package stack 104 needs to be moved, the clamp device 110 and the blade 108 may automatically adjust their vertical heights by sliding vertically along the sliding guide 106 to a proper height with respect to the height of the package stack 104. The clamp device 110 may extend and move toward the package stack 104 to clamp a higher portion of the package stack 104 from the sides above the package that needs to be moved, while the blade 108 may slide into and push underneath of the package that needs to be moved.

Upon clamping the higher portion of the package stack 104, the clamp device 110 may slide upwards to lift the higher portion of the package stack 104 up and allow the blade 108 to retract or pull back to carry the package out of the lower portion of the package stack 104, as shown in FIG. 1C. The package that is moved out of the lower portion of the package stack 104 may be placed somewhere else. For example, the package may be placed in an interior portion of the shelf 102 (i.e., a deeper portion of the package stack 104 in a horizontal direction of the package stack 104) or another shelf somewhere else in the kiosk system. In such a way, packages can be moved around to other shelves inside the kiosk or be moved out to a window through which the packages can be delivered to customers.

In the case where the package needs to be delivered to a window for pick up by a customer, the package is lowered by the blade 108 to a delivery window. The higher portion of the package stack 104 that was lifted up can be placed back to the shelf automatically by the clamp device 110, as shown in FIG. 1D.

After placing the higher portion of the package stack 104 back to the shelf 102, the clamp device 110 may be withdrawn and released from the higher portion of the package stack 104, as shown in FIG. 1E.

In some embodiments, the clamp device 110 may further include a bottom side that connects with the adjustable side arms to facilitate lifting packages by pushing the bottom side underneath the bottom of the packages.

In some embodiments, the blade 108 may comprise a fork-shaped blade. For example, just like a fork of a forklift, the fork-shaped blade can slide itself underneath packages, lift them up from beneath, and pick them up to any desired position in a package stack on a shelf.

In some embodiments, the blade 108 may be tapered in the front, so that when it is pushed to get under a heavier package, the thinner edge can help to get under the package, and the thicker part of the blade 108 can be able to bear the weight of the package.

In some embodiments, the disclosed system may also include conveyors or gear system that can be used move around packages inside the kiosk. For example, once a package is slid out of a package stack by the blade 108, the package may be placed on the conveyor system to move to a desired position either on the same shelf or on a different shelf inside the kiosk.

In some embodiments, there may be more than one shelf within the kiosk, and a particular distance between each shelf may be arranged. Further, the number of shelves within the kiosk may be dynamic. For example, these shelves can be configured in such a way that they may fold down and be stored like folding chairs. As many shelves as needed can be brought up, which may depend less on the size of packages, but more on weight of the packages. Dimensions of the packages may also be an important factor. For example, for a particularly heavy package, a decision may be made to give it its own shelf simply so nothing is crushed by the heavy package. The heavy package may alternatively be placed on the bottom of a package stack.

In some embodiments, the disclosed kiosk may have sensors that are used to determine weights and dimensions of packages. The kiosk may also include one or more label readers to read labels of the packages so that what packages have been received can be determined and the received packages can be tracked. The packages may need to be rotated or turned so that labels can be read or face forward, which may be done when the packages are originally received. For example, a receiving tray of the kiosk, upon receiving a package, may lower the package into the kiosk. The receiving tray may also be able to rotate a certain degree of angle (e.g., 360 degrees), so that the package can be received into the kiosk facing the right direction on a shelf.

Specifically, the kiosk may be configured to have a tray into which a package is delivered by a UAV. The orientation of the package may be obtained in two ways. One way may be that the UAV can be positioned so that a package can only be loaded delivered in one particular direction. The other way may be that the UAV lands the package to best suit the landing, and the package may then be placed on an elevator pole that can rotate the package. If the package is already labeled, it needs to face a certain direction. If the package is not already labeled, it may get labeled, in which case the label may need to face in a direction that is suitable for managing in the kiosk.

Rotating a package may also be based on the dimensions of the package, so the package can be efficiently stacked on a shelf. For example, some packages may not be purely square-shaped. Depending on how the package is stacked on the shelf, a decision may need to be made at which point to label the package, so the stacking of the package is based on a dimension priority instead of a label priority. Further, depending on how the kiosk is designed, the kiosk may be cylindrical or rectangular. The receiving tray that receives a package may also continue to rotate to turn the package to a proper angle at which the package can be slotted onto a given shelf.

In some embodiments, the delivered package may be received by another mechanism or conveyor within the kiosk. The package may also be picked up from the receiving tray by a clamp within the kiosk when the receiving tray is lowered, and then be inserted into a slot for stacking on a given shelf.

In some embodiments, digital watermarking may be employed to label a package on the outside of the package. For example, the package may be marked by RFID or some other mechanism whereby the package is label-less. The stacking priority may correspondingly be focused on package dimensions. In some cases, a package may contain a fragile item, or the package may be instructed as "this side up only", such requirements need to be met. For a UAV delivery, a label or marker instruction may be made in a way that a machine can read it. For the instance where there is a label on the package, it may have the label face outward so the label can be read.

In some embodiments, in addition to paper or stamp labeling, label-free elements such as, RFID or other inexpensive data chips, may be used to label packages for computers to read and provide means for people to read them. For example, a smartphone or augmented glasses may allow a label-free element to be seen in a way a person can read it but would otherwise be unreadable to the naked eye.

In some embodiments, there may be a label reader that is associated with the clamp device 110 or the blade 108. When the clamp device 110 or the blade 108 moves around, the label reader can read the label on a package.

In some embodiments, the kiosk may have at least two label readers. One label reader may read a package when the package first comes in the kiosk. The other reader may be responsible for finding and pulling a package, or verifying the package stored on a shelf. In such a way, the disclosed system can determine where packages are once they are stacked, be able to go to the right place to find a package, and be able to verify a stored package.

In some embodiments, digital watermarking, such as invisible ink, or bar codes, can be scanned from any angle to identify a package. In such case, a package may not be labeled on just one side of the package. That is, the package can be labeled as desired.

As used in this disclosure, a shelf may be a simple shelf without any dividers. The shelf may be a long shelf, a short shelf, or a combination thereof, which should use fewer shelves horizontally or vertically. The shelf may also be a shelf that can be moved up and down and adjusted vertically.

In addition, the shelf may also be able to fold down and stack like a folding chair, so that as many shelves as needed can be desired.

In some embodiments, depending on how packages are stacked, moving the packages around inside the kiosk may be desired. Because the packages may not all be a standard size, shifting packages around may be needed in order to get the packages in and out. To move the packages around inside the kiosk, the clamp device 110 may be dynamic. That is, a plurality of clamp devices 110 may be arranged, for example, in one or more rows of adjustable clamps. The plurality of clamp devices may move cooperatively with the blade 108 to lift the package stack in a more form-fitting fashion rather than being limited to grabbing the widest package. In some cases, the sliding guide 106 may embody a grid pattern for the clamp devices 110 to slide between the different grid sections. In some cases, the sliding guide 106 may embody a vertical robotic arm that can move vertically as well as horizontally. In some cases, the sliding guide 106 may embody a vertical beam and a horizontal beam that move back and forth. The clamp devices 110 can be assembled on that beam as needed.

In some embodiments, optimizing space inside the kiosk and optimizing movement of packages may be needed. For example, once enough packages are stacked on top of each other, the stacking may become unwieldy and threaten to tip over. So a determination of when it is time to slide a package in a new shelf versus stacking the package on top of another package should be made. That is, a crush factor may be considered when stacking the packages. For example, light packages, such as potato chips and cookies, may preferably be placed on the top of a package stack, and heavy packages may be placed in the lower section of the package stack. Time may also be a factor to consider. For example, space within the kiosk may be more important when customers are predicted to arrive to pick up the packages. Depending on when packages are to be picked up, the packages may be moved into a more convenient location for pickup, for example, near a pickup window area.

In addition, the dynamic clamp devices 110 may offer more flexibility and better balance. For example, the clamp device may engage two packages. One of the packages is thinner than the other. The top portion of the clamp device may be able to move in faster to get a grip and keep the balance on the packages.

In some embodiments, prioritizing based on the shape of a package may be for efficient storage, because it is designed that the clamp devices can effectively get a package from anywhere in any portion of a package stack. Further, when a customer can be predicted to pick up a package, a threshold may be added that the package comes in and the customer is coming right away. The package may be put on a convenient top of a package stack, because it is not going to be there for a long time.

In some embodiments, a threshold may be specified for a retrievable priority. For example, when the kiosk is nearing 75% full that can be a threshold at which point the disclosed system may flip the retrievable priority over to a storage or stacking priority. The focus may then be on how to stack more packages in the kiosk as opposed to prioritizing packages for customers' pickup (e.g., a customer coming in three hours to pick something up.) When determining how to stack the packages, crush factor and weight may be considered. As more and more packages are stacked within the kiosk, optimizing space may become more important.

When the kiosk space is occupied less than a threshold, the retrievable priority may of more importance. For example, the disclosed system may have predictive features, such that when the likely order of retrieval of packages by a customer is known, the packages can be stacked in a way aligned with the predicted retrieval order. In such case, packages may be just pulled off the top of the package stack, and no lifting is required.

Figure 2:
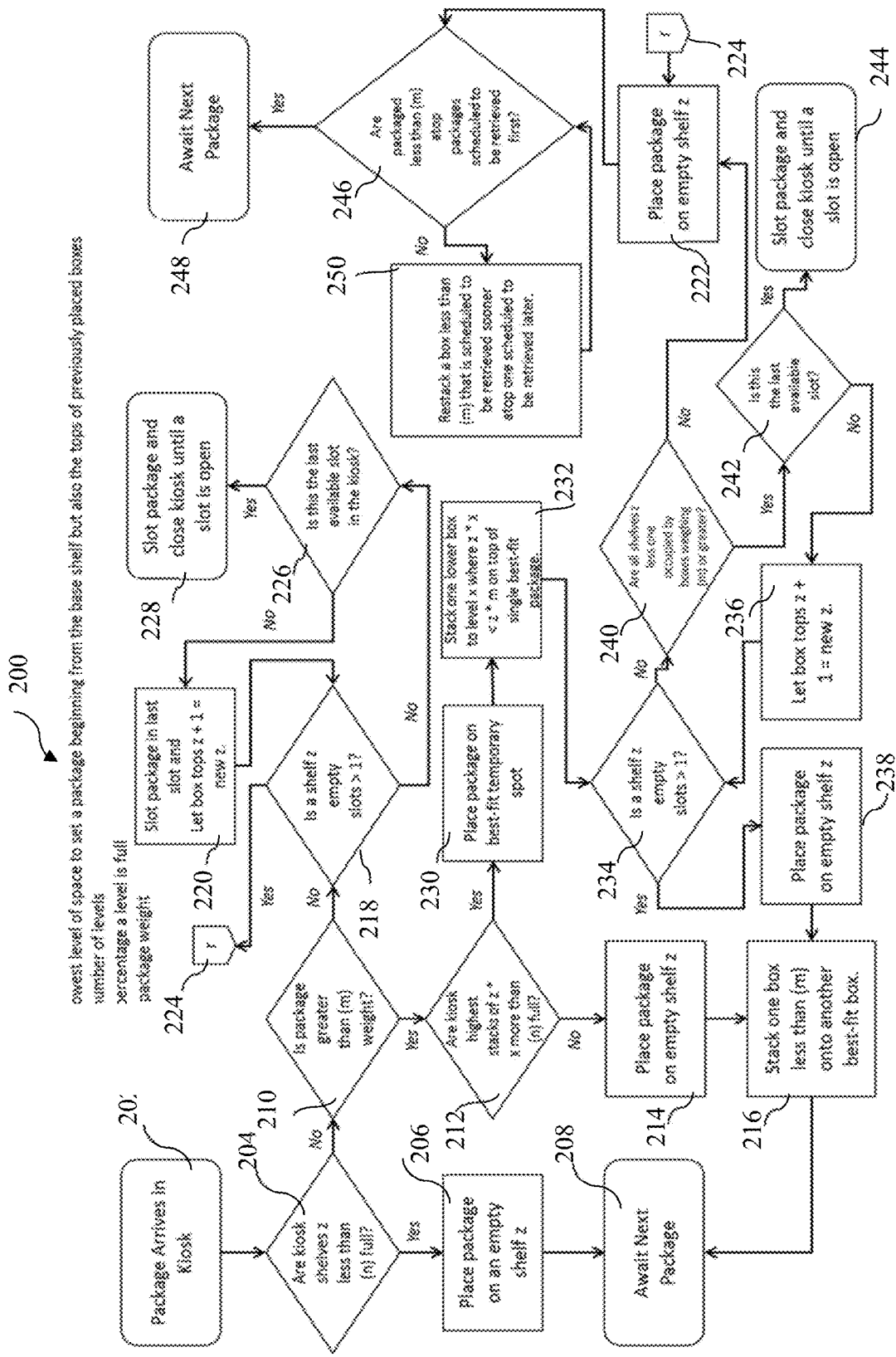
FIG. 2 illustrates a block diagram of an example logic flow for managing packages in a kiosk according to one example embodiment.

FIG. 2 illustrates a block diagram 200 for a logic flow of a kiosk system that allows a kiosk to stack and move packages within the kiosk. The logic flow may consider space availability (how much or little), time (expected flow-most important medium), material present (how many packages), weight of material (how heavy-important as space gets tight), and/or risk (weight and accessibility). Packages of a certain weight threshold may be placed at or toward the bottom of a package stack, depending upon the number of packages above the weight threshold already present. Package stacking can become more important as density within the kiosk increases. The logic flow also includes a sorting loop that moves packages likely to be retrieved first to the top of stacks.

As shown in FIG. 2, a package may be received by a kiosk from a UAV delivery (block 202). The system may check a shelf z to determine whether the shelf z has reached a threshold of n full, for example, 80% full (block 204). Herein z may indicate a lowest level of space to set a package. The z may be counted from the base shelf or the tops of previously placed packages on that base shelf. N may indicate what percentage of a level is full. If the determination from block 204 is "Yes", then the package may be placed on an empty shelf z (block 206). The system may then await a next package (block 208).

If the determination from block 204 is "No", the system may check the package weight to determine whether the package weight is greater than a weight threshold m, for example, 10 lbs. (block 210). If the determination from block 210 is "Yes", then the system may further check whether kiosk highest stacks of $z*x$ is more than (n) full (block 212). Herein x may indicate the number of levels in a package stack. If the determination from block 212 is "No", then the package may be placed on an empty shelf z (block 214). The system may then determine to stack one package less than (m) onto another best-fit package (block 216).

If the determination from block 210 is "No", then the system may further check whether a shelf z empty slots are greater than a predetermined number (e.g., 1) (block 218). Herein z may be recalculated as shown in block 220. If the determination from block 218 is "Yes", then the package may be placed on an empty shelf z (block 222) via block 224 r.

If the determination from block 218 is "No", then the system may further check whether the slot is the last available slot in the kiosk (block 226). If the determination from block 226 is "No", then the package may be slotted into the last slot of the shelf z and a new z is calculated (block 220). If the determination from block 226 is "Yes", then the package may be slotted and the kiosk may be closed until a slot is open (block 228).

Now referring back to block 212, if the determination from block 212 is "Yes", then the package may be placed on a best-fit temporary spot (block 230). The system may then stack one lower package to level x where $z*x<z*m$ on top of a single best-fit package (block 232).

The system may further check whether shelf z empty slots are greater than 1 (block 234). Herein z may be recalculated as shown in block 236. If the determination from block 234 is "Yes", then the package may be placed on an empty shelf z (block 238).

If the determination from block 234 is "No", the system may then determine whether all shelves z are occupied by packages weighing (m) or greater (block 240). If the determination from block 240 is "No", the package may be placed on an empty shelf z (block 222).

If the determination from block 240 is "Yes", then the system may further check whether the slot is the last available slot in the kiosk (block 242). If the determination from block 242 is "Yes", then the package may be slotted and the kiosk may be closed until a slot is open (block 244).

Referring back to block 222, the system may further determine whether packages less than (m) atop package stacks are scheduled to be retrieved first (block 246). If the determination from block 246 is "Yes", then the system may just wait for a next package (block 248). If the determination from block 246 is "No", then the system may restack a package less than (m) that is scheduled to be retrieved sooner atop one package scheduled to be retrieved later (block 250).

Figure 3:
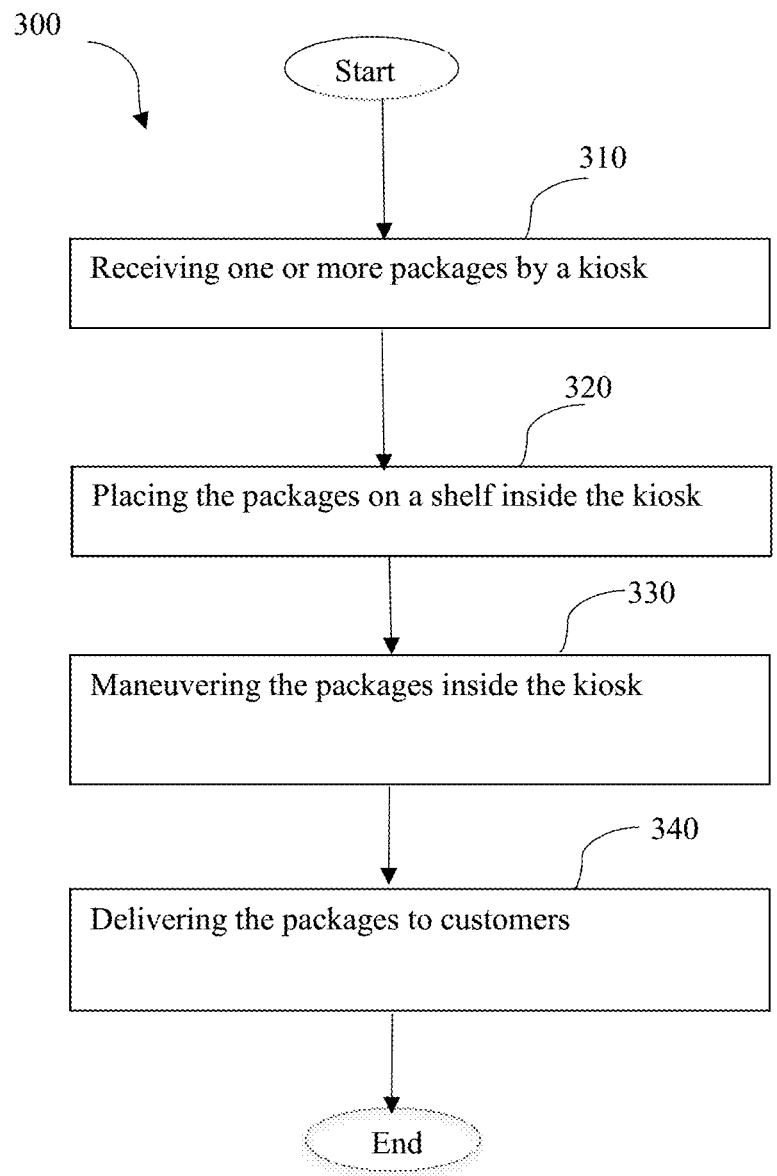
FIG. 3 illustrates an example method for managing packages in a kiosk according to one example embodiment.

Methods for automatically managing packages in a kiosk are also disclosed herein. FIG. 3 illustrates a flow chart of an example method 300 for managing packages in a kiosk. The method 300 may be implemented in the systems described above, and may include the following steps.

In step 310, one or more packages are received by a kiosk. The one or more packages may be delivered by a UAV. The kiosk can include a receiving tray for receiving the packages.

In step 320, the packages are placed on a shelf based on rules, for example, as described above. The packages may be labeled prior to the UAV delivery or may be labeled inside the kiosk after being received by the kiosk.

In step 330, the packages are maneuvered inside the kiosk. The maneuvering may include moving a package up and down on a package stack on the shelf, moving a package to another shelf, inserting a package into a package stack, and taking a package out of a package stack. The maneuvering may be based on the rules described above. The maneuvering may also include moving a package in a stack from a first location in the stack to a second location in the stack, moving a package from a first stack to a second stack, and moving a package from a stack to a delivery window for pickup.

For example, the specified rules may include, but are not limited to, a heavyweight package being placed at a lower section of a package stack, a lightweight package being placed at a higher section of the pack stack, a fragile package being place at a top position of a package stack, a package stack being up to a threshold of fullness, and a package soon to be picked up by a customer being moved to a top of the package stack.

For example, the specified rules may also include, but are not limited to: 1) packages predicted to be picked up by customers are placed atop of their respective stacks, 2) heavy packages are placed at the bottoms of their respective stacks, and 3) package dimensions are given a higher priority for stacking.

In step 340, the packages are delivered to customers. The packages may be lowered to a pickup window for pickup by customers when the customers arrive at the kiosk.

In some embodiments, the method 300 may include orientating the packages to have the labels of the packages face a desired direction. For example, the packages may be rotated by the receiving tray when being received from the UAV.

In some embodiments, the method 300 may include labeling the packages inside the kiosk. For example, a printer inside the kiosk may be used to automatically print labels on the packages.

Another example method for managing packages in a kiosk, may include: receiving a package by the kiosk, the kiosk including a receiving tray for receiving the packages; determining a lowest available level of space of a shelf inside the kiosk with a fullness of less than a first specified fullness for storing the package; placing the package in an empty slot of the lowest available level of space of the shelf when the lowest available level of space of the shelf is determined to be less than the first specified fullness; determining a weight of the package when the lowest available level of space of the shelf is determined to be greater than the first specified fullness; determining a level of the shelf with a highest stack of packages with a fullness less than a second specified fullness, when the weight of the package is determined to be greater than a predetermined weight, wherein all levels of space of the shelf below the level with the highest stack of package are full; and placing the package in an empty slot of the level of the shelf with the highest stack of packages when the level of the shelf with the highest stack of packages is determined to be less than the second specified fullness.

The example method may further include: determining empty slots of the lowest available level of space of the shelf inside the kiosk, when the weight of the package is determined to be less than the predetermined weight; and placing the package in an empty slot of the lowest available level space of the shelf inside the kiosk when the empty slots of the available level of space of the shelf inside the kiosk are determined to be greater than a predetermined number.

The example method may further include: when the level of the shelf with the highest stack of packages is determined to greater than the second specified fullness; placing the package on a best-fit temporary spot; moving a package with a weight less than the predetermined weight from a level below the level with the highest stack of package to an empty slot of the level with the highest stack of packages; and moving the package from the best-fit temporary spot to a slot where the package with the weight less than the predetermined weight was placed.

The example method may further include: determining whether the empty slots are a last available slot in the kiosk when the empty slots of the available level of space of the shelf inside the kiosk are determined to be less than the predetermined number; placing the package in the empty slot when the empty slot is determined to be the last slot; and closing the kiosk until a slot is open.

Figure 4:
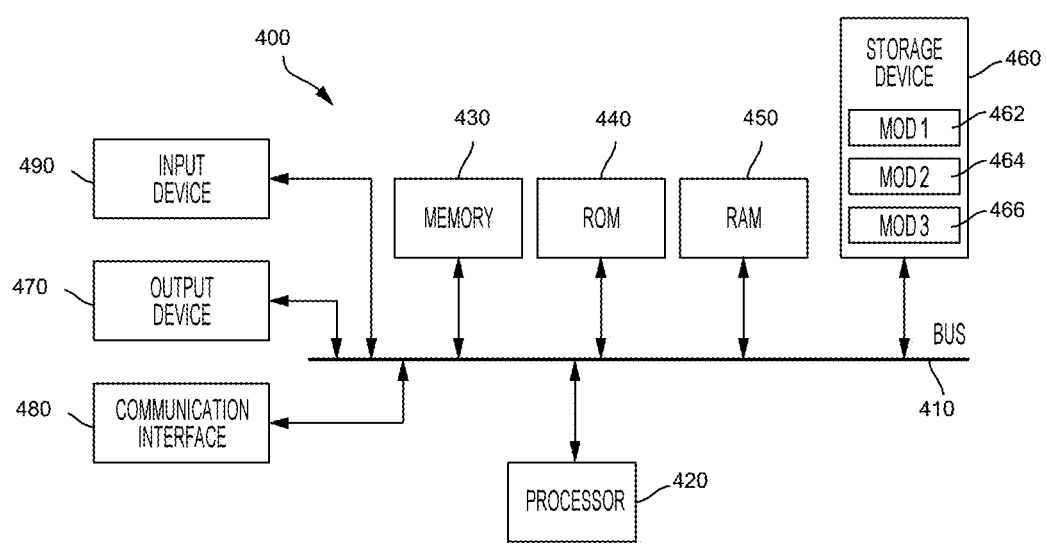
FIG. 4 illustrates an example computer system which can be used to implement systems and methods for managing packages in a kiosk according to one example embodiment.

FIG. 4 illustrates an example computer system 400 which can be used to perform the systems for inventory monitoring as disclosed herein. The exemplary system 400 can include a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A package storage system for a kiosk, comprising:
a shelf on which packages are stacked, the shelf configured to be adjustable in a vertical height;
a sliding guide configured to be movable with respect to the shelf;
a clamp device having two adjustable side arms, the clamp device being slidably attached to the sliding guide and configured to grip one of the packages by the two adjustable side arms;
a blade slidably attached to the sliding guide and configured to pull out a package that is stacked immediately beneath the one package gripped by the clamp device;
a labeling device configured to label the packages inside the kiosk;
a receiving tray configured to receive the packages that are delivered to the kiosk; and
a controller configured to control movement of the clamp device,
wherein the controller is further programmed to move the packages based on specified rules and specified priorities.

2. The system of claim 1, wherein the labeling device is a printer.

3. The system of claim 1, wherein the shelf is foldable.

4. The system of claim 1, wherein the clamp device slides in a groove of the sliding guide.

5. The system of claim 1, wherein the sliding guide forms a guide grid.

6. The system of claim 1, wherein the blade is tapered in a front edge.

7. The system of claim 1, wherein the clamp device is further configured to be retractable from and extendable toward the packages.

8. The system of claim 1, wherein the clamp device is further configured to have a bottom side for support the one package while the one package is gripped by the two adjustable arms.

9. The system of the claim 1, wherein the moving of the packages includes one or more of: moving a package in a package stack from a first location in the package stack to a second location in the package stack, moving a package from a first package stack to a second package stack, and moving a package from a package stack to a delivery window for pickup.

10. The system of claim 1, wherein the specified rules include one or more of: a heavyweight package being placed at a lower section of a package stack, a lightweight package being placed at a higher section of the package stack, a fragile package being placed at a top position of the package stack, and the package stack being up to a threshold of fullness.

11. The system of claim 1, wherein the specified priorities include at least one of: packages predicted to be picked up by customers are placed atop of their respective stacks, heavy packages are placed at bottoms of their respective stacks, and package dimensions are given a higher priority for stacking.

12. A method for managing packages in a kiosk, comprising:
receiving a package by the kiosk, the kiosk including a receiving tray for receiving the packages and a shelf therein for storing the package;
determining a lowest available level of space of the shelf with a fullness of less than a first specified fullness for storing the package;
placing the package in an empty slot of the lowest available level of space of the shelf when the lowest available level of space of the shelf is determined to be less than the first specified fullness;
determining a weight of the package when the lowest available level of space of the shelf is determined to be greater than the first specified fullness;
determining a level of the shelf with a highest stack of packages with a fullness less than a second specified fullness, when the weight of the package is determined to be greater than a predetermined weight, wherein all levels of space of the shelf below the level with the highest stack of package are full; and
placing the package in an empty slot of the level of the shelf with the highest stack of packages when the level of the shelf with the highest stack of packages is determined to be less than the second specified fullness.

13. The method of claim 12, the method further comprising:
determining empty slots of the lowest available level of space of the shelf inside the kiosk, when the weight of the package is determined to be less than the predetermined weight; and
placing the package in an empty slot of the lowest available level space of the shelf inside the kiosk when the empty slots of the available level of space of the shelf inside the kiosk are determined to be greater than a predetermined number.

14. The method of claim 12, the method further comprising:
placing the package on a best-fit temporary spot when the level of the shelf with the highest stack of packages is determined to greater than the second specified fullness;
moving a package with a weight less than the predetermined weight from a level below the level with the highest stack of package to an empty slot of the level with the highest stack of packages; and
moving the package from the best-fit temporary spot to a slot where the package with the weight less than the predetermined weight was placed.

15. The method of claim 13, further comprising:
determining whether the empty slots are a last available slot in the kiosk when the empty slots of the available level of space of the shelf inside the kiosk are determined to be less than the predetermined number;
placing the package in the empty slot when the empty slot is determined to be the last slot; and
preventing the kiosk from receiving additional packages until a slot is open.

16. The method of claim 12, further comprising stacking a package with a weight less than a weight threshold above a package with a weight greater than the weight threshold.

17. The method of claim 12, further comprising stacking a package scheduled to be retrieved sooner atop a package scheduled to be retrieved later.

18. The method of claim 12, further comprising orientating the package to face a desired direction.

19. The method of claim 12, further comprising labeling the package inside the kiosk.

20. The method of claim 12, further comprising delivering the package from its slot to a customer via a delivery window.

* * * * *